United States Patent [19]

Dransman

[11] Patent Number: 5,115,377
[45] Date of Patent: May 19, 1992

[54] WIREWAY CHANNEL ASSEMBLY FOR ELECTRICAL CABINETS

[75] Inventor: Robert J. Dransman, West Chester, Ohio

[73] Assignee: Cincinnati Milacron Inc., Cincinnati, Ohio

[21] Appl. No.: 709,546

[22] Filed: Jun. 3, 1991

[51] Int. Cl.⁵ .............................................. H01R 9/00
[52] U.S. Cl. ................................. 361/426; 174/72 A; 174/72 R; 361/427
[58] Field of Search ................... 174/72 A, 72 R, 97; 361/426, 427, 428; 439/110, 534

[56] References Cited

U.S. PATENT DOCUMENTS

| | | | |
|---|---|---|---|
| 2,896,009 | 7/1959 | Caveney | 361/428 |
| 3,968,322 | 7/1976 | Taylor | 174/72 A |
| 4,053,719 | 10/1977 | Debortoli et al. | 361/428 |
| 4,641,225 | 2/1987 | Reichle | 361/429 |
| 5,023,404 | 6/1991 | Hudson et al. | 174/97 |
| 5,035,645 | 7/1991 | Siemon et al. | 174/72 A |

FOREIGN PATENT DOCUMENTS

| | | | |
|---|---|---|---|
| 2431262 | 1/1976 | Fed. Rep. of Germany | 361/428 |
| 0035894 | 3/1977 | Japan | 174/72 A |

Primary Examiner—Leo P. Picard
Assistant Examiner—Donald A. Sparks
Attorney, Agent, or Firm—John W. Gregg

[57] ABSTRACT

A wireway channel assembly is provided for assuring unimpaired access to terminals of terminal strips placed in close lateral proximity to relatively deep wireways. A channel member having a substantially "U" shaped cross section includes at least one oblique flange portion in a side thereof. A first wireway is mounted to the inside of the "U" at the base thereof, and a second wireway is mounted to the outside of the side of the channel including the flange portion. A terminal strip is mounted to the flange portion. Wires to be terminated at the terminal strip are routed through openings in the sides of the wireways to the terminals as is conventional.

5 Claims, 1 Drawing Sheet

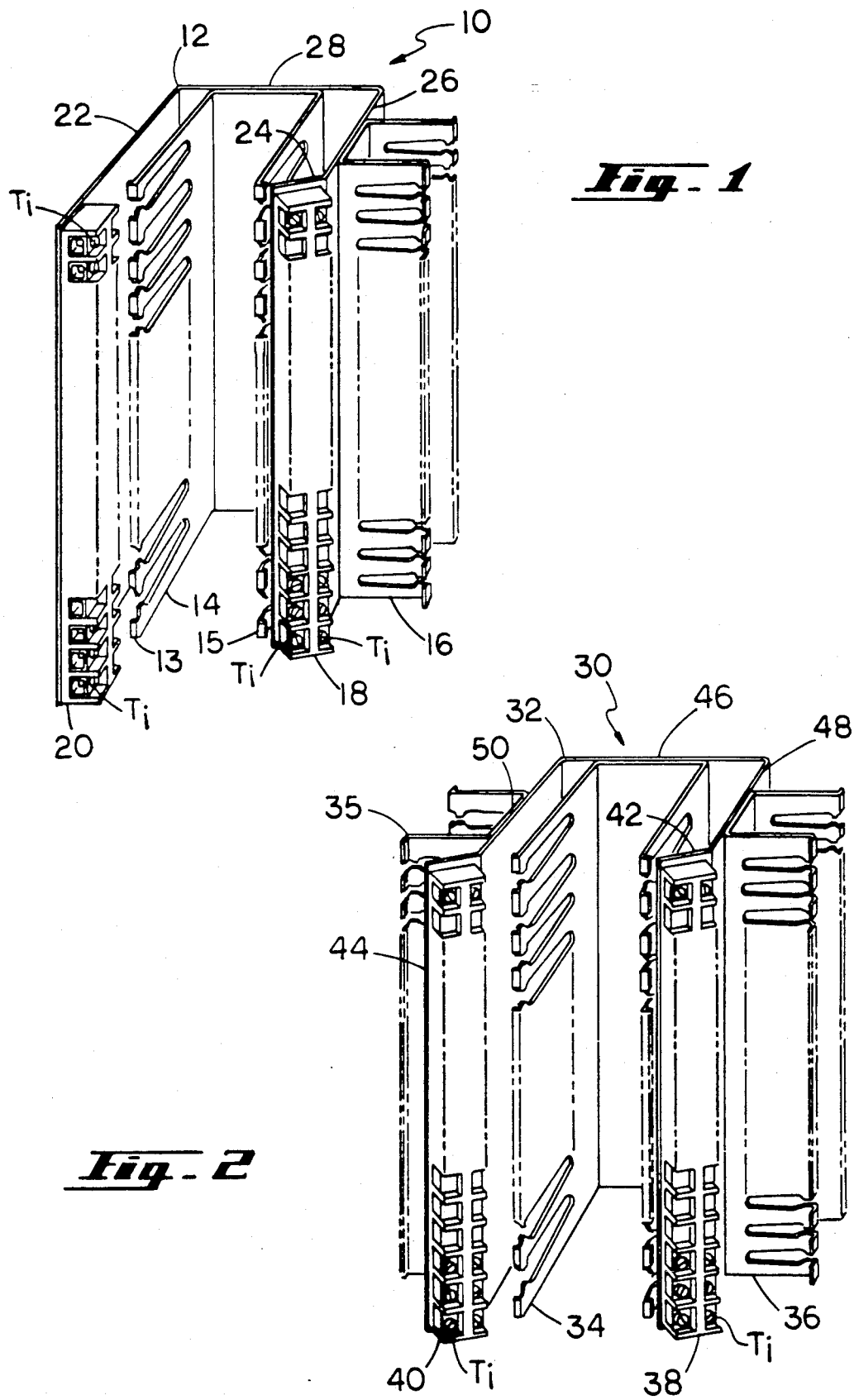

WIREWAY CHANNEL ASSEMBLY FOR ELECTRICAL CABINETS

BACKGROUND OF THE INVENTION

I. Field of the Invention

This invention relates to electrical cabinets. In particular this invention relates to means for mounting wireways and terminal strips within electrical cabinets.

II. Description of the Prior Art

Wireways used in electrical cabinets to confine wiring and permit wire termination at adjacent terminal strips are commonly fabricated as three sided channels of various depths and widths. In the event a wireway having a depth greater than the height of a terminal strip is mounted adjacent the terminal strip, access to the terminals for purposes of making wire terminations may be impaired. In such instances, it is necessary to locate the terminal strip relative to the wireway such as by lateral spacing to provide unimpaired access to the terminals. Lateral spacing increases the surface area required for mounting of wireways and terminal strips and this disadvantage is further exacerbated where a single terminal strip is used to terminate wires confined in two wireways, one on each side of the terminal strip.

SUMMARY OF THE INVENTION

It is an object of the present invention to provide an electrical cabinet channel assembly having wireways and terminal strips in close lateral proximity one to the other so as to optimize the balance of competing requirements for cabinet panel area and unimpaired access to terminals.

It is a further object of the present invention to provide a channel assembly for wireways and terminal strips wherein a terminal strip may be mounted between two wireways such that access to terminals of the terminal strip is unimpaired by the close lateral proximity of the wireways and the terminal strip.

It is a still further object of the present invention to provide a channel assembly for wireways and terminal strips wherein the terminal strips are relative the depth of the wireways such that access to the terminals of the terminal strip is unimpaired by the close lateral proximity of the wireways.

In accordance with the aforesaid objects, a wireway channel assembly in accordance with the present invention provides an arrangement of relatively deep wireways and terminal strips minimizing the required lateral spacing and assuring unimpaired access to the terminal strip terminals. A channel member having a substantially "U" shaped cross section includes at least one oblique flange portion in a side thereof. A first wireway is mounted to the inside of the "U" at the base thereof, and a second wireway is mounted to the outside of the side of the channel including the flange portion. A terminal strip is mounted to the flange portion. Wires within the wireways to be terminated at the terminal strip are routed through openings in the sides of the wireways to the terminals as is conventional.

Further objects and advantages of the present invention shall become apparent from the accompanying drawings and the description thereof.

BRIEF DESCRIPTION OF THE DRAWINGS

FIG. 1 is an isometric view of a first alternative embodiment of the channel assembly of the present invention.

FIG. 2 is an isometric view of a second alternative embodiment of the channel assembly of the present invention.

DESCRIPTION OF PREFERRED EMBODIMENTS

To illustrate the invention a wireway channel assembly for a machine electrical cabinet manufactured by Cincinnati Milacron Inc., the assignee of the present invention, shall be described in detail. While this wireway assembly constitutes a preferred embodiment of the invention, it is not the intention of applicant to limit the invention to the details thereof. Rather, it is the intention of the applicant that the invention be defined in accordance with the appended claims and all equivalents thereto.

Referring to FIG. 1 a wireway channel assembly 10 particularly suitable for mounting proximate a cabinet corner is shown. A channel member 12 having a substantially "U" shaped cross section and formed preferably from metal is fastened at, for example, a side portion 22 or base portion 28 to a panel or wall of an electrical cabinet. A flange portion 24 is formed in one side of the channel while to opposing side of the channel is plane. The channel may be mounted with its base and plane side flush against intersecting cabinet walls.

Continuing with reference to FIG. 1, a terminal strip 18 is mounted to flange portion 24 to provide termination points for wires contained in wireways 14 and 16. Flange portion 24 is at an oblique angle to the sides of channel member 12 thereby reducing the unusable space behind terminal strip 18. A second terminal strip 20 may be affixed to the plane side. By mounting the channel assembly 10 with side portion 22 spaced from a cabinet wall, the terminal strip 20 may be located to provide convenient termination points for wires contained in a wireway fixed to that cabinet wall and wires within wireway 14.

Wireways 14 and 16 are of known construction having sides with openings through which wires may pass to permit termination at terminals of adjacent terminal strips. To permit fixing of a cover (not shown) to the wireways, the edges of the sides are formed with lips, such as lips 13 and 15, which cooperate with formed edges of the cover to retain it in place. The wireways are advantageously fabricated of resilient material such as PVC plastic such that the sides flex for fitting and removing the cover. The terminal strips 18 and 20 are of conventional construction providing, for example, screw terminals for receiving wire termination lugs or wire clamping terminals for capturing bared conductors. As is conventional, wires are routed through the openings in the sides of wireways 14 and 16 proximate the terminals $T_i$ of terminal strips 18 and 20 at which the wires are to be terminated.

Desired lengths of channel member 12 are readily fabricated by bending of precut flat metal strips or by cutting lengths of formed channel material. Corresponding lengths of wireway may be cut from prefabricated sections thereof and terminal strips of desired predetermined length are selected according to the required quantity and terminal dimensions of wire terminations.

Referring to FIG. 2 a wireway channel assembly 30 in accordance with the present invention and particularly suitable for mounting in an open panel area is shown. A channel member 32 having a substantially "U" shaped cross section is intended to be fastened to a cabinet wall or panel by a base portion 46. A first wireway 34 is mounted inside the "U" at base portion 46, a second wireway 36 is mounted to the outside of side portion 48, and a third wireway 35 is mounted to the outside of side portion 50. All of the wireways 34, 35 and 36 are of like construction and of the same type as the wireways 14 and 16 of FIG. 1. A first terminal strip 38 is mounted to first flange portion 42 and a second terminal strip 40 is mounted to second flange portion 44. Both first and second flange portions 42 and 44 are oblique to the sides of channel member 32.

While the channel members of the preferred embodiments are provided with at least one flange portion shown formed to project toward the inside of the "U" of the channel member, it will be appreciated that alternative constructions could advantageously include solely flanges which are formed to project away from the inside of the "U" or solely flanges which are formed to project toward the inside of the "U". It will further be appreciated that the height of the sides of the "U" are determined according to the height of the wireway chosen to be mounted inside the "U", the objective being placement of the terminal strips so as to provide access to the terminals thereof unimpaired by the lateral proximity of the terminal strip and the wireway. While applicant has found that in some applications the angle between the flange and the side of the "U" is advantageously approximately 45°, other angles may be advantageously used according to the objective of optimization of the balance of the competing requirements of surface area consumed by the channel member and free access to the terminals of the terminal strips.

What is claimed is:

1. A wireway channel assembly for electrical cabinets comprising:
   a. a channel member fabricated of a single piece of material and having a substantially "U" shaped cross section with at least one flange portion formed in a side thereof, the flange being oblique to the sides of the channel member;
   b. a first wireway mounted inside the "U" of the channel member at the base thereof;
   c. a second wireway mounted to the side of the channel member including the flange portion; and
   d. a terminal strip mounted to the flange portion for terminating wires confined within the first and second wireways.

2. The wireway channel assembly of claim 1 wherein the flange portion extends toward the inside of the "U".

3. The wireway channel assembly of claim 1 wherein a second terminal strip is mounted inside the "U" on the side of the channel member not including the flange portion, the second terminal strip providing terminations for wires confined within the first wireway.

4. A wireway channel assembly for electrical cabinets comprising:
   a. a channel member fabricated of a single piece of material and having a substantially "U" shaped cross section and including flange portions formed in the sides thereof, the flange portions being oblique to the sides of the channel member;
   b. a first wireway mounted inside the "U" of the channel member at the base thereof;
   c. a second wireway mounted to a first side of the channel member and outside the "U";
   d. a first terminal strip mounted to the flange portion of the first side of the channel, the first terminal strip for terminating wires confined within the first and second wireways; and,
   e. a second terminal strip mounted to the flange portion of the second side of the channel for terminating wires confined within the first wireway.

5. The wireway channel assembly of claim 4 further comprising a third wireway mounted to the second side of the channel and outside the "U".

* * * * *